2,900,295

METHOD OF TREATING NEMATODES WITH THIOUREA AND SUBSTITUTED-THIOUREA COPPER COMPLEXES

Bobbie D. Stone, Miamisburg, Ohio, assignor to Monsanto Chemical Company, St. Louis, Mo., a corporation of Delaware No Drawing. Application April 17, 1957
Serial No. 653,294

6 Claims. (Cl. 167—22)

This invention relates to nematocidal compositions containing copper (I) complexes of thiourea and substituted-thioureas, and to a method of using these complexes to kill nematodes.

The nematode is an important economic pest, which is of widespread occurrence in soils throughout the world. Nematodes are considered responsible for field crop losses to the value of several hundred million dollars annually in the United States alone. The problem of eradication of nematodes demands a soil fumigant which will be an effective nematocide and yet will either be completely non-phytotoxic and/or rapidly eliminated from the soil, so as not to interfere with subsequent planting.

As an active ingredient in the nematocidal compositions of the invention, I use a copper (I) complex selected from the class consisting of those having 1 to 3 molecules of thiourea per copper atom, 1 to 4 molecules of ethylenethiourea per copper atom, 1 to 3 molecules of phenylthiourea per copper atom, and 1 to 2 molecules of diphenylthiourea per copper atom. It is intended that the ranges specified above not only be inclusive of the numbers mentioned but also include fractional as well as integer intermediate numbers.

The nematocidal compositions of the invention are particularly valuable for the protection and/or disinfecting of certain roots (e.g., bulbs, tubers, etc.) of nematodes whereby the roots are dipped in or sprayed with the nematocidal compositions. Normally it is preferred to use water solutions or emulsions of the complexes at concentrations of about 0.01 to 0.1% of the active complex ingredient, although in some cases higher or lower concentrations will be desirable depending on the particular complex used.

A number of the copper (I), i.e., cuprous, thiourea or substituted-thiourea complexes which are useful as active ingredients in nematocidal compositions and for use in killing nematodes, are specifically listed below. This list is not meant to be a complete listing of all such compounds but merely to be illustrative thereof within the definition of the invention as defined above. As complexes they are known in the prior art and the method of making them is also well known.

The following are the thiourea complexes: general formula [Cu(thiourea)]X, specific examples: [Cu(thiourea)]Cl, [Cu(thiourea)]Cl.½H$_2$O, [Cu(thiourea)]Br.4H$_2$O, [Cu(thiourea)]NO$_2$.½H$_2$O; general formula: [Cu(thiourea)$_2$]X, specific examples: [Cu(thiourea)$_2$]Cl, [Cu(thiourea)$_2$]CN.H$_2$O, [Cu(thiourea)$_2$]NO$_3$.H$_2$O; general formula [Cu(thiourea)$_3$]X, specific examples: [Cu(thiourea)$_3$]Cl, [Cu(thiourea)$_3$]Br, [Cu(thiourea)$_3$]I, [Cu(thiourea)$_3$]$_2$C$_2$O$_4$, [Cu(thiourea)$_3$]$_2$C$_2$O$_4$.7H$_2$O, [Cu(thiourea)$_3$]HC$_2$O$_4$.H$_2$O, [Cu(thiourea)$_3$]$_2$HPO$_4$, [Cu(thiourea)$_3$]$_2$HAsO$_4$, [Cu(thiourea)$_3$]NO$_2$; miscellaneous—[Cu(thiourea)(H$_2$O)]NO$_2$, [Cu(thiourea)$_2$(H$_2$O)]NO$_3$, [Cu(thiourea)$_2$(H$_2$O)]Cl, [Cu(thiourea)$_2$(H$_2$O)]HSO$_4$, [Cu(thiourea)$_2$(H$_2$O)]$_2$C$_2$O$_4$, [Cu$_2$(thiourea)$_2$(H$_2$O)]Cl$_2$, [Cu$_2$(thiourea)$_2$(H$_2$O)](NO$_2$)$_2$, [Cu$_2$(thiourea)$_5$](NO$_3$)$_2$.2H$_2$O, [Cu$_2$(thiourea)$_5$](NO$_3$)$_2$, [Cu$_2$(thiourea)$_5$]SO$_4$.2H$_2$O, [Cu$_2$(thiourea)$_4$(H$_2$O)](NO$_2$)$_2$, [Cu$_2$(thiourea)$_5$(H$_2$O)]SO$_4$.H$_2$O, [Cu$_2$(thiourea)$_5$(H$_2$O)](NO$_3$)$_2$, [Cu$_3$(thiourea)$_7$](NO$_3$)$_3$, [Cu$_3$(thiourea)$_7$(H$_2$O)$_2$](NO$_3$)$_3$, [Cu$_5$(thiourea)$_{11}$](NO$_3$)$_5$.8H$_2$O, [Cu$_5$(thiourea)$_{11}$(H$_2$O)$_4$](NO$_3$)$_5$, and [Cu(thiourea)$_3$]Cl.2[Cu(thiourea)$_2$(H$_2$O)]ClO$_4$; etc.

The tendency of thiourea to stabilize copper (I), i.e., cuprous salts, is also shown by ethylenethiourea formula:

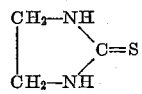

A number of these ethylenethiourea complexes containing from 1 to 4, inclusive, molecules of ethylenethiourea per copper atom are shown as follows: general formula [Cu(ethylenethiourea)]X, specific examples: [Cu(ethylenethiourea)]Cl, [Cu(ethylenethiourea)]$_2$O, general formula [Cu(ethylenethiourea)$_2$]X, specific examples: [Cu(ethylenethiourea)$_2$]Cl, [Cu(ethylenethiourea)$_2$]Br, [Cu(ethylenethiourea)$_2$]I; general formula [Cu(ethylenethiourea)$_3$]X, specific examples: [Cu(ethylenethiourea)$_3$]$_2$SO$_4$, [Cu(ethylenethiourea)$_3$]C$_2$H$_3$O$_2$; general formula [Cu(ethylenethiourea)$_4$]X, specific examples: [Cu(ethylenethiourea)$_4$]NO$_3$; miscellaneous—[Cu$_2$(ethylenethiourea)$_5$] (O C N)$_2$.H$_2$O, [Cu$_2$(ethylenethiourea)$_5$(H$_2$O)](NO$_3$)$_2$.3H$_2$O; etc. All of the above complexes are also known in the prior art with the possible exception of the first compound in this paragraph, and it is suggested that this type can be made also. This complex, [Cu(ethylenethiourea)]Cl is prepared by mixing equal mole quantities of cuprous chloride and ethylenethiourea.

Also a number of the phenylthiourea complexes are known and the method of making them is also known. Some of these phenylthiourea complexes are shown below: phenylthiourea complexes—[Cu$_2$(phenylthiourea)$_6$]SO$_4$, [Cu$_2$(phenylthiourea)$_3$]SO$_4$; diphenylthiourea complexes—[Cu(diphenylthiourea)]Cl and [Cu(diphenylthiourea)$_2$]Cl, etc.

All the complexes listed specifically above are known complexes and also, of course, their method of preparation is known with the possible exception of the one type wherein the preparation is specifically set forth by example.

The invention will be more clearly understood from the following detailed description of specific examples thereof:

*Example 1*

Preparation of [Cu(thiourea)$_3$]Cl. A sample of 22.8 g. (0.3 mole) of thiourea was dissolved in 100 ml. of water and heated to 70° C. To this solution was added 9.85 g. (0.10 mole) of CuCl. This solution was stirred for some time to get all the cuprous chloride to react. A residue of sulfur formed and this was filtered off. The solution was allowed to stand for several days. An appreciable amount of evaporation had occurred from the solution reducing the volume down to 50 ml. and a small amount of additional sulfur had collected. This sulfur was filtered off. As the solution was filtered to remove the sulfur, large crystals began to separate in the filtrate and the solution was heated to dissolve these crystals. After filtration the filtrate was cooled in an ice-salt bath causing the precipitation of a large amount of fine, white crystals. These crystals were separated by filtration and washed with water at 2–3° C. The washed crystals were dried overnight in a vacuum desiccator giving a yield of 22.5 g. (68.8%). An elemental analysis was made of these crystals and yielded the following results:

|  | Found | Calcd. for [Cu(thiourea)₃]Cl |
|---|---|---|
| Percent N | 24.14 | 25.7 |
| Percent S | 27.0 | 29.4 |
| Percent Cl | 9.38 | 10.9 |

*Example 2*

Preparation of [Cu(ethylenethiourea)₄]NO₃. A sample of 25 g. (0.245 mole) of ethylene thiourea was dissolved in 300 ml. of boiling water. To this solution was added 12.5 g. (0.052 mole) of Cu(NO₃)₂.3H₂O in about 50 ml. of hot water. The cupric nitrate solution was dissolved almost immediately. On standing, colloidal sulfur slowly separated from the solution. The solution was allowed to stand for a few days, after which time the solution had evaporated down to 300 ml. and a quantity of long white needles had separated. The mixture was heated to dissolve the crystals and the hot solution was filtered to remove the sulfur. In cooling the filtrate slowly, long white needles separated and the mixture was cooled in an ice-salt bath to give more small crystals. The crystals were removed by filtration and a little cold water was used to wash them. The washed crystals were dried overnight in air to give a yield of 26.4 g., (88.2%) of the desired product. An elemental analysis was made on the crystals yielding the following results:

|  | Found | Calcd. for [Cu(ethylenethiourea)₄]NO₃ |
|---|---|---|
| Percent N | 23.39 | 23.58 |
| Percent S | 23.73 | 24.01 |
| Percent C | 27.01 | 27.00 |
| Percent H | 4.67 | 4.53 |

*Example 3*

Nematocidal activity of the tetrakis(ethylenethiourea)-copper (I) nitrate and the tris(thiourea)copper (I) chloride was demonstrated by the following tests in aqueous suspension:

It is known that a nematode, when placed in water, flexes its body at a more or less constant rate, and that the effect of a nematocide can be estimated reasonably accurately by counting the rate of this flexing action. This motility is observed through a microscope, and the number of flexures counted, the effect of the nematocide expressed as a percentage of the normal flexing rate of a controlled dispersion of a nematode not containing a nematocidal agent.

Emulsions of the complexes of Examples 1 and 2 were prepared by dissolving 1 g. of each of the sample in a few ml. of acetone, adding an emulsifying agent known to the trade as (Tween 20) said to be a polyoxyethylene sorbitan monolaurate, and bringing the mixture up to 50 ml. with water, giving an aqueous emulsion containing 2 percent by weight of the complex. Aqueous suspensions of the nematode, *Panagrellus redivivis*, were placed in Stender dishes, and concentrations of 0.1% and 0.01% of the test complexes, calculated on the volume of the nematode suspension, were added to the Stender dishes, after which the motility of the nematodes were estimated at regular intervals as compared to a controlled nematode suspension containing no complex. The results of this test are shown in the following table:

| Motility after— | [Cu(ethylenethiourea)₄]NO₃ Complex | | [Cu(thiourea)₃]Cl Complex | | Control, percent |
|---|---|---|---|---|---|
|  | 0.1% | 0.01% | 0.1% | 0.01% |  |
| 10 min | 100 | 100 | 100 | 100 | 100 |
| 20 min | 85 | 95 | 70 | 100 | 100 |
| 30 min | 65 | 95 | 40 | 100 | 100 |
| 60 min | 40 | 95 | 40 | 95 | 100 |
| 2 hrs | 10 | 95 | 25 | 90 | 100 |
| 24 hrs | 1 | 95 | 0 | 15 | 100 |

*Example 4*

Nematocidal activity of the copper (I) thiourea complexes in soil is shown below. Two batches of 500 g. each of uninfected soil were placed in containers. The soil was then inoculated with root-knot nematode, Meloidogyne spt., by addition to each container of 25 ml. of a suspension prepared by grinding 2 g. of the washed roots of plant infected by the nematodes in 100 ml. of water. After inoculating the soil, sufficient water was added to bring the potting soil to field capacity. The two lots of infested soil were then treated with emulsions prepared as described above, to give, respectively, 0.1% and 0.01% concentrations in the soil of the complexes as a drench; the containers were kept and allowed to stand one week, after which a 2-week old marglobe tomato seedling was transferred to each container. An untreated, but similarly inoculated, control was also planted. After a growing period of two months, the tomato plants were harvested and roots washed and examined for evidence of infestation.

Both at 0.1% and at 0.01% concentrations, the tetrakis(ethylenethiourea)copper (I) nitrate and the tris-(thiourea)copper (I) chloride treated plants showed no appreciable infestation of the nematode; compared to the heavy infestation shown by the roots of the control exposed to the infection without addition of a protective chemical. Both of these complexes also exhibited low phytotoxicity to the tomato plant at these concentrations.

The copper (I) complexes with thiourea, ethylenethiourea and phenyl- and diphenylthiourea are effective in eliminating or suppressing the nematode activity when applied to soil at the rate of 50–500 lbs. per acre. These compounds will vary somewhat in nematocidal activity but all will be active. Usually, concentrations of 100–200 lbs. per acre will produce effective nematode control in soils of average infestation level. Lightly infected areas may be treated effectively with smaller concentrations. The compounds may be applied to the soils, e.g., as dusts as compositions together with fertilizers, by injection into the soil, or by spray in emulsion form.

In addition to use in soils, the compositions of the invention may also be applied to other nematode environments, such as greenhouse potting mixtures, and other soil substitutes. The copper (I) complexes of the invention are also useful in destroying animal endo-parasitic worms, such as flukes and tapeworm during the soil phase in their life cycle, and may usefully be applied, e.g., to barnyards and other soils which it is desired to sterilize.

The compounds of Examples 1 and 2 have also been tested for fungicidal activity, and such activity has been demonstrated. For example, the compound of Example 1 shows activity at concentrations as low as 156 p.p.m. against cucumber leaf spot disease, *Colletotrichum lagenarium*, but the compound of Example 2 requires an appreciably higher concentration; both compounds show excellent activity in spore germination tests on the organisms, *Stemphylium sarcinaeforme* and *Monilinia fructicola* at concentrations of 200 p.p.m.; and, both compounds show excellent activity against the tomato leaf-spot disease, *Stemphylium solani*, in systemic tests at concentrations as low as 100 p.p.m.

Although the invention has been described in terms of specified embodiments which are set forth in considerable detail, it should be understood that this by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention or of the scope of the appended claims.

What is claimed is:

1. The method of controlling nematodes which comprises exposing said nematodes to a toxic quantity of a nematocidal composition comprising as an essential active ingredient a copper (I) complex selected from the class consisting of those having 1 to 3 molecules of thiourea per copper atom, 1 to 4 molecules of ethylenethiourea per copper atom, 1 to 3 molecules of phenylthiourea per copper atom, and 1 to 2 molecules of diphenylthiourea per copper atom, said ranges specified above being inclusive of the numbers mentioned and including fractional as well as integer intermediate numbers.

2. The method of claim 1 wherein said copper (I) complex is tris(thiourea)copper (I) chloride.

3. The method of claim 1 wherein said copper (I) complex is tetrakis(ethylenethiourea)copper (I) nitrate.

4. The method of controlling nematodes on roots which method comprises applying directly to said roots a toxic quantity of a nematocidal composition comprising as an essential active ingredient a copper (I) complex selected from the class consisting of those having 1 to 3 molecules of thiourea per copper atom, 1 to 4 molecules of ethylenethiourea per copper atom, 1 to 3 molecules of phenylthiourea per copper atom, and 1 to 20 molecules of diphenylthiourea per copper atom, said ranges specified being inclusive of the numbers mentioned and including fractional as well as integer intermediate numbers.

5. The method of claim 4 wherein said copper (I) complex is tris(thiourea)copper (I) chloride.

6. The method of claim 4 wherein said copper (I) complex is tetrakis(ethylenethiourea)copper (I) nitrate.

References Cited in the file of this patent

Parnell et al.: Brit. J. Pharmacol., vol. 7, 1952, pp. 509–512, 515.

J.A.C.S., vol. 72, September-December, 1950, pp. 4724–8.

Chem. Abst., vol. 49, 1955, p. 2191e.